US008860278B2

(12) United States Patent
Morgante (10) Patent No.: US 8,860,278 B2
(45) Date of Patent: Oct. 14, 2014

(54) STATOR ASSEMBLY FOR BELT ALTERNATOR STARTER MOTOR GENERATOR FOR HYBRID VEHICLES

(75) Inventor: John C. Morgante, Sterling Heights, MI (US)

(73) Assignee: GM Global Technology Operations LLC

(*) Notice: Subject to any disclaimer, the term of this patent is extended or adjusted under 35 U.S.C. 154(b) by 330 days.

(21) Appl. No.: 12/130,213

(22) Filed: May 30, 2008

(65) Prior Publication Data

US 2009/0026868 A1    Jan. 29, 2009

Related U.S. Application Data

(60) Provisional application No. 60/952,432, filed on Jul. 27, 2007.

(51) Int. Cl.
| | |
|---|---|
| *H02K 3/12* | (2006.01) |
| *H02K 3/14* | (2006.01) |
| *H02K 1/27* | (2006.01) |
| *H02K 17/16* | (2006.01) |
| *H02K 3/34* | (2006.01) |
| *H02K 1/24* | (2006.01) |

(52) U.S. Cl.
CPC .. *H02K 3/12* (2013.01); *H02K 3/34* (2013.01); *H02K 1/2766* (2013.01); *H02K 17/165* (2013.01); *H02K 1/246* (2013.01); *H02K 3/345* (2013.01)
USPC ....... 310/201; 310/156.53; 310/207; 310/215

(58) Field of Classification Search
CPC .................................. H02K 3/12; H02K 3/14
USPC .............................. 310/201, 215, 207, 156.53
See application file for complete search history.

(56) References Cited

U.S. PATENT DOCUMENTS

| | | | | |
|---|---|---|---|---|
| 2,407,935 | A | * | 9/1946 | Perfetti et al. ................. 310/201 |
| 4,568,846 | A | * | 2/1986 | Kapadia ................... 310/156.83 |
| 5,965,965 | A | * | 10/1999 | Umeda et al. .................... 310/52 |
| 6,137,201 | A | * | 10/2000 | Umeda et al. ................. 310/179 |
| 6,181,043 | B1 | * | 1/2001 | Kusase et al. ................. 310/201 |
| 6,376,961 | B2 | * | 4/2002 | Murakami et al. ............ 310/184 |
| 6,555,940 | B2 | * | 4/2003 | Naito et al. ............... 310/156.56 |
| 6,885,124 | B2 | * | 4/2005 | Neet ............................. 310/208 |
| 7,002,318 | B1 | | 2/2006 | Schulz et al. |
| 7,145,273 | B2 | * | 12/2006 | Even et al. ....................... 310/71 |
| 7,190,101 | B2 | | 3/2007 | Hirzel |

(Continued)

FOREIGN PATENT DOCUMENTS

| | | | |
|---|---|---|---|
| EP | 130863 A1 | 1/1985 | |
| FR | 2760576 | * 9/1998 | ............... H02K 3/34 |

(Continued)

OTHER PUBLICATIONS

Machine Translation, JP 2001238389, "Prepreg Insulated Coil for Rotating Electric Machine", Aug. 31, 2001, Koji Ohata et a.*

*Primary Examiner* — Terrance Kenerly (57) ABSTRACT

A stator assembly comprises a stator defining S slots. First and second windings are arranged in each of the S slots. The two windings have a width in a radial direction and a thickness in a direction perpendicular to the radial direction. A ratio of the width to the thickness is between 3.0:1 and 4.5:1.

16 Claims, 6 Drawing Sheets

(56) References Cited

U.S. PATENT DOCUMENTS

| | | |
|---|---|---|
| 7,245,054 B1 | 7/2007 | Walls et al. |
| 7,468,569 B2 | 12/2008 | Hirzel |
| 2005/0093393 A1 | 5/2005 | Hirzel |
| 2006/0055273 A1* | 3/2006 | Lasa Berasategui et al. .. 310/211 |
| 2007/0114871 A1* | 5/2007 | Imai et al. .................... 310/206 |
| 2007/0170810 A1 | 7/2007 | Hirzel |
| 2009/0026868 A1* | 1/2009 | Morgante ................. 310/156.38 |
| 2012/0001512 A1* | 1/2012 | Dajaku ......................... 310/195 |
| 2012/0274171 A1* | 11/2012 | Ishikawa et al. .............. 310/198 |
| 2013/0221792 A1* | 8/2013 | Tokumasu et al. ........... 310/203 |

FOREIGN PATENT DOCUMENTS

| | | | |
|---|---|---|---|
| JP | 2001-238389 | * 8/2001 | .............. H02K 3/32 |
| WO | WO-0237643 A2 | 5/2002 | |
| WO | WO-2005043714 A2 | 5/2005 | |

\* cited by examiner

STATOR ASSEMBLY FOR BELT ALTERNATOR STARTER MOTOR GENERATOR FOR HYBRID VEHICLES

CROSS-REFERENCE TO RELATED APPLICATIONS

This application claims the benefit of U.S. Provisional Application No. 60/952,432, filed on Jul. 27, 2007. The disclosure of the above application is incorporated herein by reference in its entirety.

FIELD

The present disclosure relates to electric machines, and more particularly to a belt alternator starter (BAS) motor generator for hybrid vehicles.

BACKGROUND

The statements in this section merely provide background information related to the present disclosure and may not constitute prior art.

Hybrid powertrains typically include a first torque generator, such as an internal combustion engine (ICE), and a second torque generator, such as an electric machine (EM). Both can provide torque to a driveline to propel a vehicle.

In a full hybrid powertrain, the EM can drive the drivetrain directly, without transferring torque through a component of the ICE. In a mild hybrid powertrain, the EM is coupled with the ICE, through the accessory drive. Torque generated by the EM is transferred to the drivetrain through the ICE. An exemplary mild hybrid powertrain includes a belt alternator starter (BAS) system. In the BAS system, the EM is coupled to the ICE via a traditional belt and pulley configuration, which drives other accessory components including, but not limited to, pumps and compressors.

Because the EM adds weight and cost to the vehicle, the efficiency of the EM needs to be optimized.

SUMMARY

A stator assembly comprises a stator defining S slots. First and second windings are arranged in each of the S slots. The first and second windings have a width in a radial direction and a thickness in a direction perpendicular to the radial direction. A ratio of the width to the thickness is between 3.0:1 and 4.5:1.

In other features, the ratio is between 3.5:1 and 4.0:1. The ratio is between 3.8:1 and 4.0:1. The ratio is approximately 3.9:1.

In other features, an electric machine comprises the stator assembly. The electric machine is a 3-Phase electric machine. The first and second windings are both connected to one of the three phases.

In other features, a permanent magnet electric machine comprises the stator assembly and further comprises a rotor assembly including rotor laminations defining poles each including a first "V"-shaped slot arranged radially outside of a second "V"-shaped slot. Permanent magnet material is arranged in the first and second "V"-shaped slots.

In other features, an induction machine comprises the stator assembly and further comprises a rotor assembly including rotor laminations defining poles.

In other features, the first and second windings comprise wave windings with substantially rectangular conductors. The width of the first winding plus the second winding is approximately equal to a width of the slots. The thickness of the first winding is approximately equal to a thickness of the slots. S is equal to 72.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

The present disclosure provides an improved stator assembly design for permanent magnet and induction electric machines (EM). In addition, rotor assemblies for the permanent magnet and induction EM are described herein. For purposes of illustration, the EM may be used in a hybrid vehicle with a belt alternator starter (BAS) system. However, the EMs described herein can be used in other applications.

Figure 1:
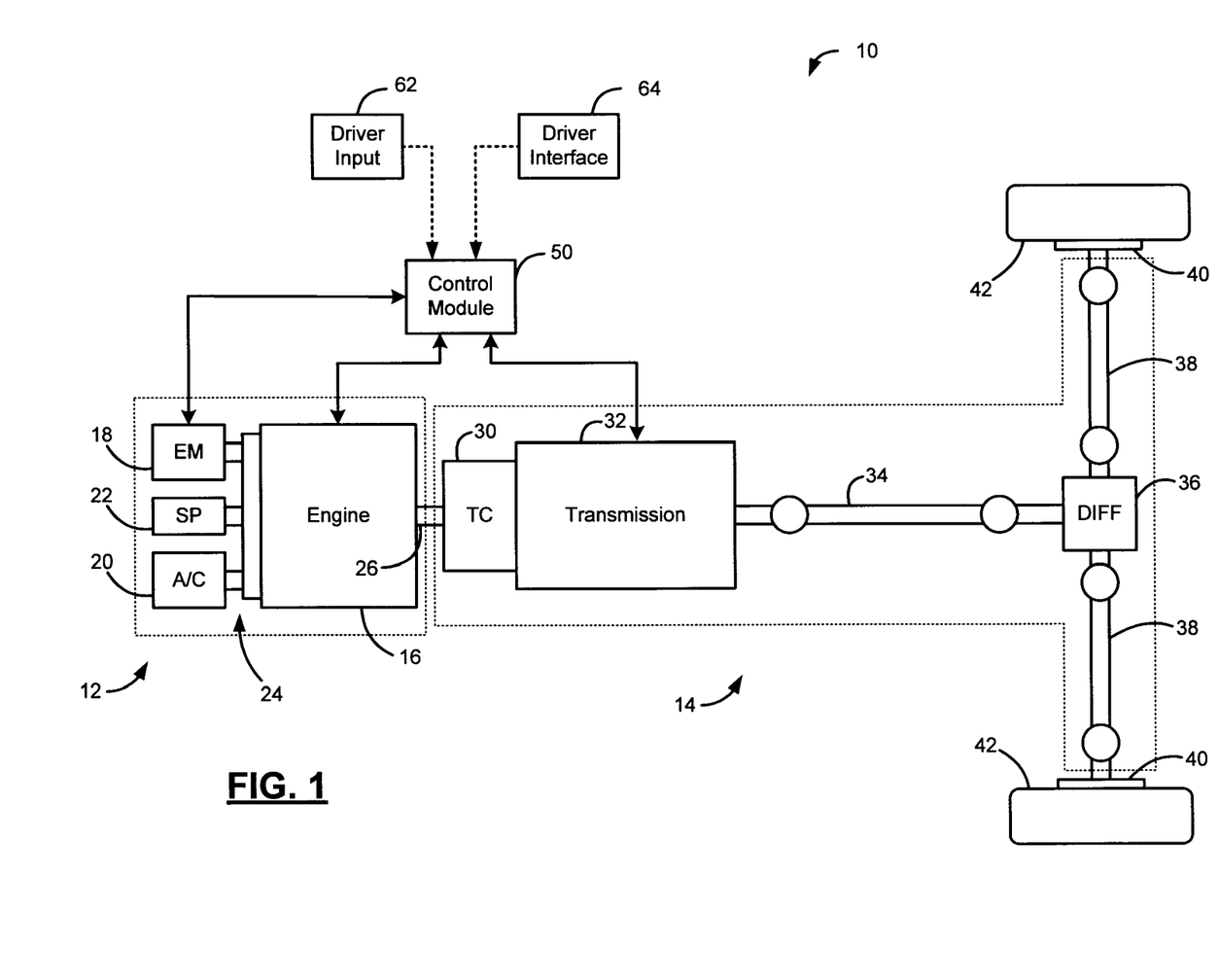
FIG. 1 is a functional block diagram of a vehicle comprising an engine and transmission system with a belt alternator starter (BAS) electric machine (EM) according to the present disclosure.
Figure 2:
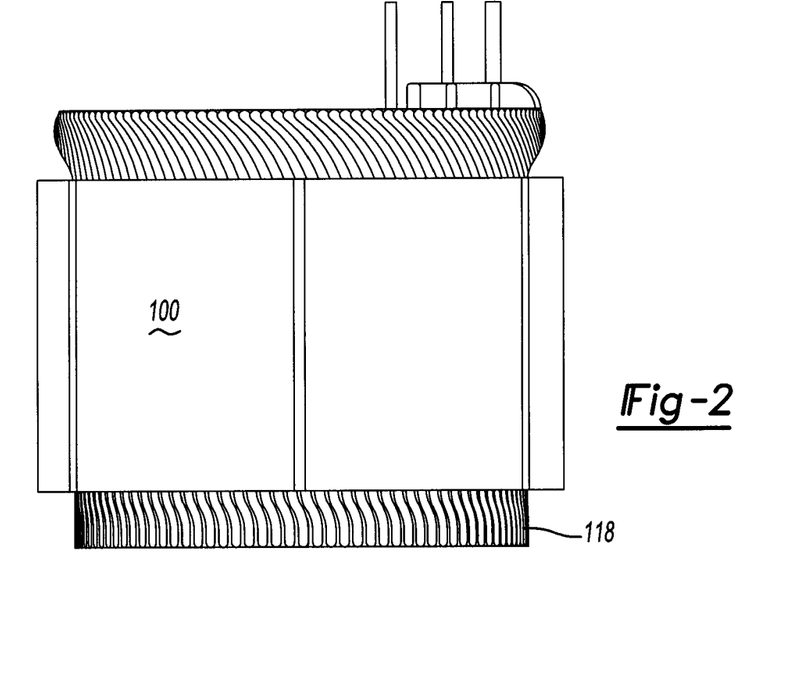
FIG. 2 is a side view of the BAS EM.
Figure 3:
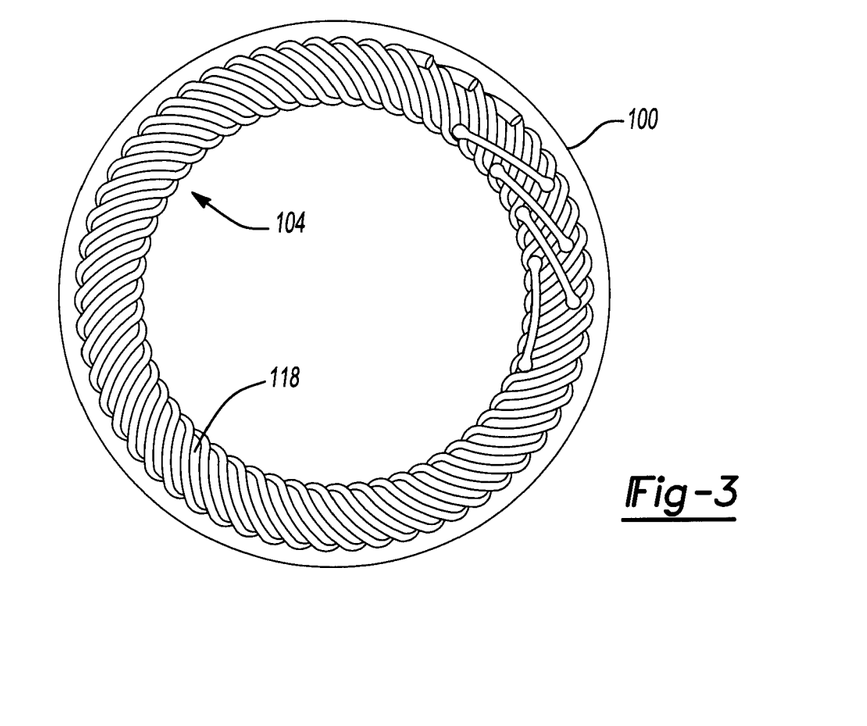
FIG. 3 is a plan view of a stator assembly and housing of the BAS EM.

Referring now to FIG. 1, an exemplary hybrid powertrain 10 will be described in detail. Although the exemplary powertrain 10 is illustrated as a rear wheel drive (RWD) powertrain, the present disclosure applies to any other powertrain configuration. The exemplary powertrain 10 includes a propulsion system 12 and a drivetrain system 14. The propulsion system 12 includes an engine 16 and an electric machine (EM) 18.

The propulsion system 12 can also include auxiliary components including, but not limited to, an A/C compressor 20 and a steering pump 22. The EM 18 and the auxiliary components are drivingly coupled to the engine using a belt and pulley system 24. The belt and pulley system 24 includes a plurality of pulleys that are fixed for rotation with the EM 18, the auxiliary components and the crankshaft 26 of the engine 16, as well as a belt to enable torque to be transferred to/from the crankshaft 26 from/to the EM 18 and/or the auxiliary components. This configuration is referred to as a belt alternator starter (BAS) system.

The crankshaft 26 of the engine 16 drives the drivetrain system 14. The drivetrain system 14 includes a flexplate or flywheel (not shown), a torque converter or other coupling device 30, a transmission 32, a propeller shaft 34, a differential 36, axle shafts 38, brakes 40 and driven wheels 42. A propulsion torque that is output at the crankshaft 26 of the engine 16 is transferred through the drivetrain system components to provide axle torque at the axle shafts 38 to drive the wheels 42. More specifically, propulsion torque is multiplied by several gear ratios provided by the coupling device 30, the transmission 32 and the differential 36 to provide axle torque at the axle shafts 38.

The powertrain 10 also includes a control module 50, which regulates operation of the powertrain 10. Driver input 62 is transmitted to the control module 50. The driver input 62 can include, but is not limited to, an accelerator pedal and/or a cruise control system. A driver interface 64 also provides input to the control module 50. The driver interface 64 includes, but is not limited to, a transmission range selector (e.g., a PRNDL lever).

Referring now to FIGS. 2-6, exemplary embodiments of the EM 18 are shown. Both induction and permanent magnet EMs are shown. The permanent magnet EM includes a stator core 100 (FIGS. 2 and 3), a stator assembly 104 (FIGS. 3, 4A, 5 and 6) and a permanent magnet rotor assembly 108-1 (FIG. 4A). The induction EM includes a stator core 100 (FIGS. 2 and 3), a stator assembly 104 (FIGS. 3, 4B, 5 and 6) and an induction rotor assembly 108-2 (FIG. 4B).

In FIGS. 3, 4A, 5 and 6, the stator assembly 104 may comprise a stator 112 defining slots 114 and windings 118 that are arranged in the slots 114. The stator 112 may comprise a plurality of stacked stator laminations 126. The EM 18 may be a 3-Phase BAS motor generator.

Figure 5:
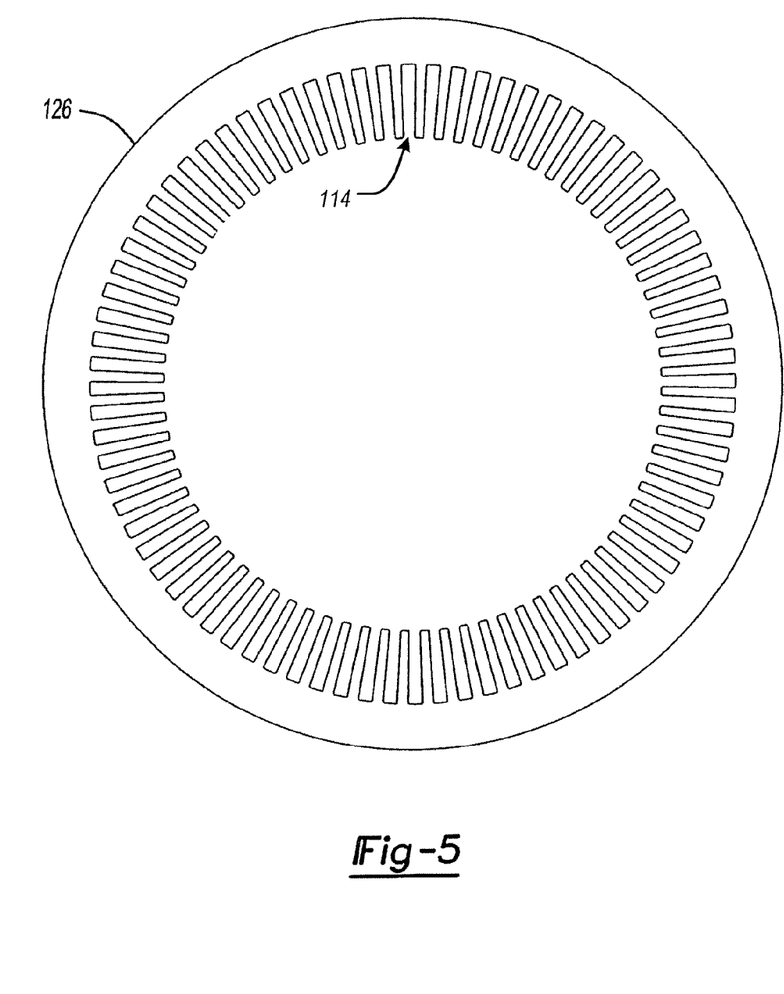
FIG. 5 is a plan view of a stator lamination.

In FIG. 5, one of the stator laminations 126 is shown. For example only, the stator core 100 may comprise 72 slots. The stator lamination 126 may be made of a magnetic material. The magnetic material may comprise M19 steel or another suitable magnetic material. The stator lamination 126 may include a lamination coating 128 to reduce inter-laminar losses. The coating may comprise a C5 or C6 coating.

Figure 6:
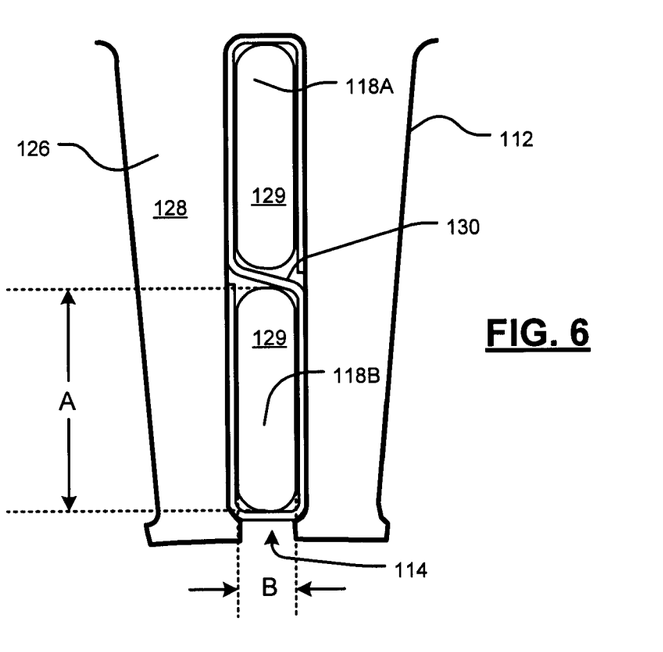
FIG. 6 is an enlarged view illustrating windings in a stator slot.

In FIG. 6, the stator 112 may be bar wound. For example only, the windings 118A and 118B may comprise two-layer wave winding with rectangular conductors. The rectangular conductors may include radiused corners. As can be appreciated, the windings 118A and 118B substantially fill the slot to provide a high slot fill percentage.

Each slot 114 may receive two windings 118A and 118B having the same phase. The stator may comprise 8 poles and 3 phases. Therefore, each of the phases may be wound about the stator 8 times in groups of 3 adjacent slots. In other words, Phase A may occupy slots 1-3, followed by Phase B in slots 4-6 and Phase C in slots 7-9. The Phases A-C repeat this pattern 7 additional times.

The windings 118A and 118B may have a generally rectangular cross-sectional shape with a width A and a thickness B. The ratio of the width A to the thickness B may be between 3.0:1 and 4.5:1. More particularly, the ratio of the width A to the thickness B may be between 3.5:1 and 4.0:1. More particularly, the ratio of the width A to the thickness B may be between 3.8:1 and 4.0:1. More particularly, the ratio of the width A to the thickness B may be approximately 3.9:1. As used herein, "approximately 3.9:1" comprises between 3.85:1 and 3.95:1. The windings 118 may be coated with a winding coating 129. The winding coating 129 may comprise an inverter grade coating. For example only, the winding coating 129 may comprise varnish, polyamideimide, or other suitable coating.

Insulation 130 may be arranged between the slots and the windings 118A and 118B. The insulation 130 may be formed into an "S" shape. The insulation 130 may comprise multiple layers. For example only, the layers may comprise Nomex-Mylar-Nomex.

Referring back to FIG. 4A, the rotor assembly 108-1 may comprise rotor laminations 140-1 and slots 142-1A and 142-1B (collectively slots 142-1). The rotor assembly 108-1 may comprise a (8×5=40) slot closed-slot construction. The PM permanent magnet rotor 108-1 may comprise 5 slots per pole, for an 8 pole rotor. Two "V"-shaped rotor slots 142-1A and 142-1B may include permanent magnet material. For example, the permanent magnet material may be similar to Hitachi magnet grade 38EH material.

A small slot 143 between a radially inner "V"-shaped slot 142-1B may provide an air vent hole and weight reduction and may not include permanent magnet material. The polarity for each pole alternates between north and south. The polarity for the slots in FIG. 4A may be either north or south. Both sides of the "V"-shaped magnet arrangement may have the same polarity. In other words, the entire pole may be either north or south.

Figure 4A:
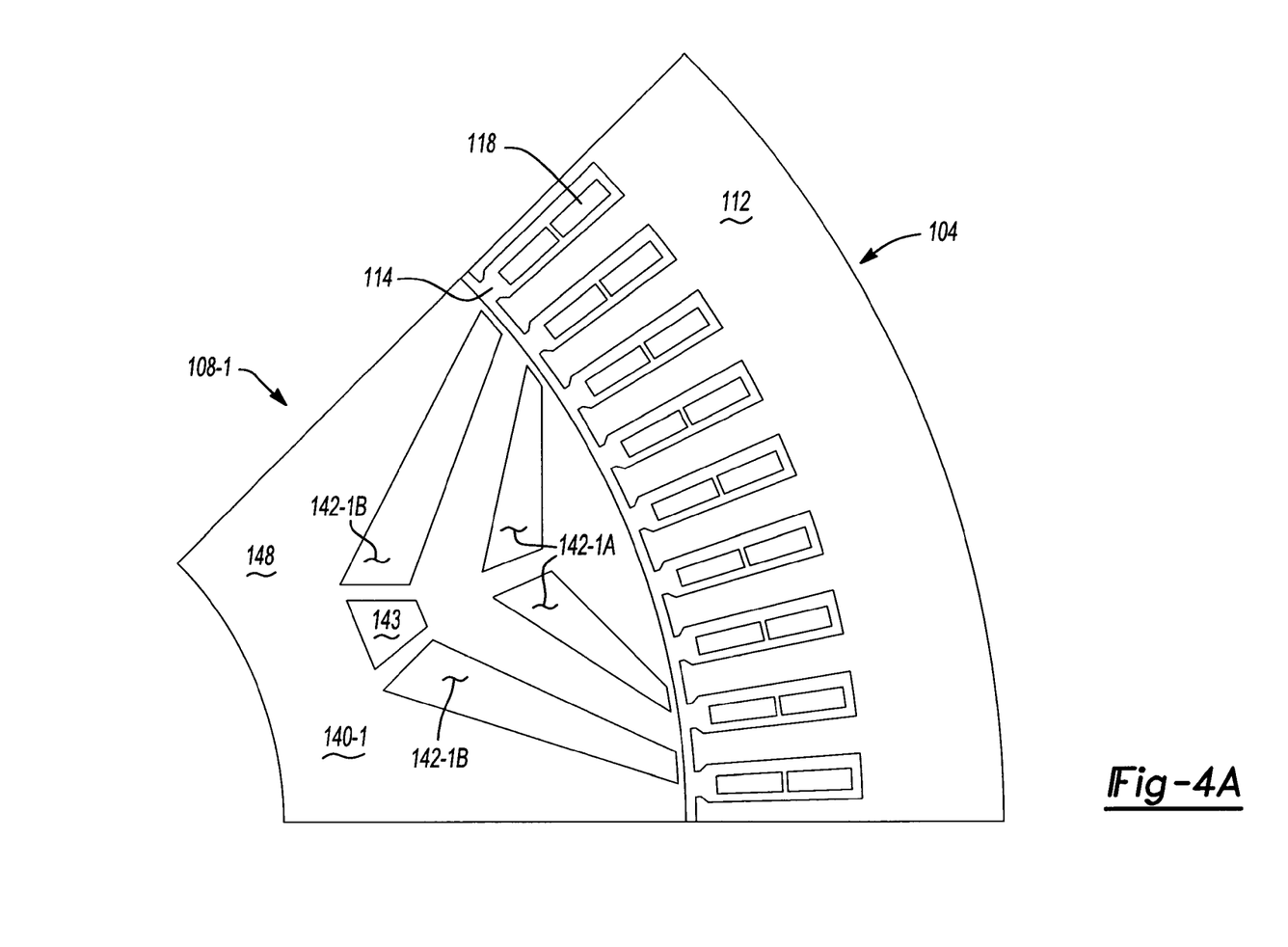
FIG. 4A is a cross-sectional view of rotor and stator assemblies for a permanent magnet EM.
Figure 4B:
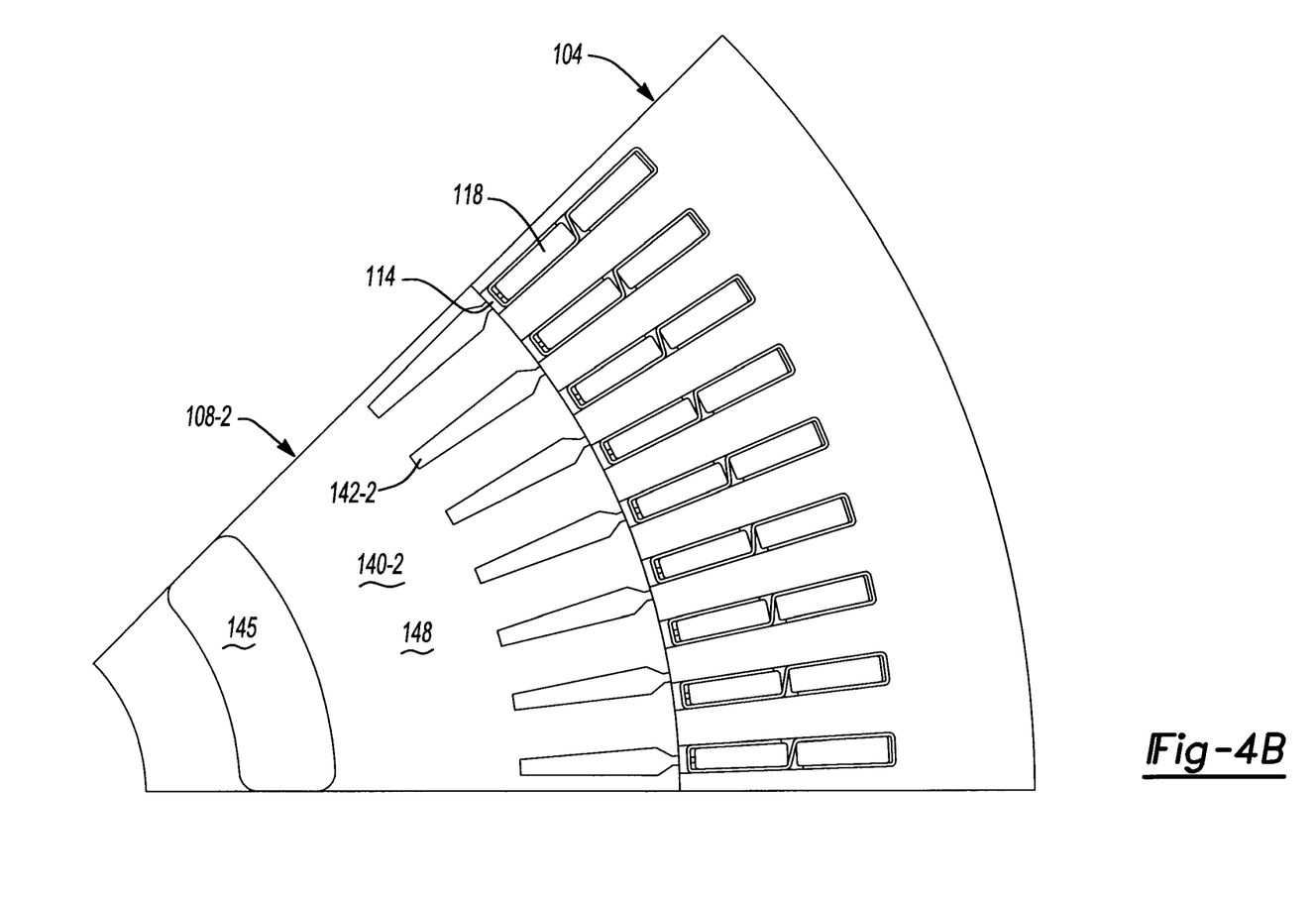
FIG. 4B is a cross-sectional view of rotor and stator assemblies for an induction EM.

Referring now to FIG. 4B, the EM may comprise an induction EM including the stator 104 and a rotor 108-2. The rotor assembly 108 may comprise rotor laminations 140-2 and slots 142-2. For example only, the rotor assembly 108-2 may comprise a 54 open slot construction. In other implementations, the rotor slot count may be 56, 58 or 68. The rotor assembly 108-2 may comprise Aluminum bars in the slots 142-2 and end rings (not shown). The Aluminum may comprise relatively pure Aluminum. The Aluminum may have Aluminum content greater than 99%. The Aluminum content may be greater than 99.7%.

The rotor laminations 140-2 may have one or more mass reduction holes 145 located radially inside of a magnetic diameter of the rotor assembly 108-2. The rotor laminations 140-2 may be made of a magnetic material. The magnetic material may comprise steel. The steel may comprise post-annealed M19 steel. The steel may be coated with a coating 148 to reduce inter-laminar losses. The coating may be C5 or C6 coating. The rotor assembly 108-2 may support a skew of up to 1 slot and alternate end ring and bar materials (including copper).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:
1. A 3-phase electric machine comprising:
   a stator assembly comprising:
      a stator having 72 slots; and
      first and second windings that are arranged in each of said 72 slots,
      the first and second windings each having a width in a radial direction and a thickness in a direction perpendicular to said radial direction,
      wherein a ratio of said width to said thickness is between 3.0:1 and 4.5:1;

wherein the 72 slots include 8 different groups of 9 adjacent slots, each of the 8 different groups of 9 adjacent slots including:
  a first set of the first and second windings that are connected to a first one of three phases and that are arranged in first, second, and third adjacent ones of the 9 adjacent slots;
  a second set of the first and second windings that are connected to a second one of the three phases and that are arranged in fourth, fifth, and sixth adjacent ones of the 9 adjacent slots; and
  a third set of the first and second windings that are connected to a third one of the three phases and that are arranged in seventh, eighth, and ninth adjacent ones of the 9 adjacent slots; and
a rotor assembly including a plurality of slots.

2. The 3-phase electric machine of claim 1 wherein the rotor assembly includes 8 different groups of slots, each of the 8 different groups of slots including:
  a first "V"-shaped slot;
  a second "V"-shaped slot arranged radially outside of the first "V"-shaped slot; and
  a permanent magnet material that is disposed within the first and second "V"-shaped slots.

3. The 3-phase electric machine of claim 1 wherein each of the 72 slots of the stator assembly includes insulation that insulates the first and second windings from the stator assembly and that includes multiple layers.

4. The 3-phase electric machine of claim 3 wherein the insulation includes a Mylar layer disposed between layers of Nomex.

5. The 3-phase electric machine of claim 1 wherein the stator assembly further includes a plurality of stacked laminations that are made of a magnetic material.

6. The 3-phase electric machine of claim 5 wherein the magnetic material includes M19 steel.

7. The 3-phase electric machine of claim 5 wherein the stacked laminations include a lamination coating.

8. The 3-phase electric machine of claim 7 wherein the lamination coating includes one of a C5 coating and a C6 coating.

9. The 3-phase electric machine of claim 1 wherein the first and second windings are coated with a winding coating.

10. The 3-phase electric machine of claim 9 wherein the winding coating includes one of varnish and polyamideimide.

11. The 3-phase electric machine of claim 1 wherein the rotor assembly includes a plurality of rotor laminations that are made of a magnetic material.

12. The 3-phase electric machine of claim 11 wherein the magnetic material includes M19 steel.

13. The 3-phase electric machine of claim 11 wherein the rotor laminations are coated with a coating.

14. The 3-phase electric machine of claim 13 wherein the coating includes one of a C5 coating and a C6 coating.

15. The 3-phase electric machine of claim 13 wherein the first and second windings comprise wave windings with substantially rectangular conductors.

16. The 3-phase electric machine of claim 13 wherein:
  the width of said first winding plus the width of the second winding is approximately equal to a width of the slots; and
  the thickness of said first and second windings is approximately equal to a thickness of the slots.

* * * * *